United States Patent [19]
Jones et al.

[11] 3,971,714
[45] July 27, 1976

[54] HOPPER SCREENING APPARATUS

[75] Inventors: Robert D. Jones; Jerry L. Hall, both of Oskaloosa, Iowa

[73] Assignee: Intraco, Inc., Oskaloosa, Iowa

[22] Filed: May 19, 1975

[21] Appl. No.: 578,535

[52] U.S. Cl. .............................. 209/257; 209/346; 209/393
[51] Int. Cl.² ......................................... B07B 1/28
[58] Field of Search ................. 209/395, 393, 260, 209/257, 325, 365A, 275, 346, 348, 333, 335; 221/172, 200, 202; 222/231, 245

[56] References Cited
UNITED STATES PATENTS

| | | | |
|---|---|---|---|
| 311,186 | 1/1885 | Hart et al. | 209/393 |
| 1,070,552 | 1/1913 | Steffy | 209/365 A |

*Primary Examiner*—Stanley H. Tollberg
*Attorney, Agent, or Firm*—Henderson, Strom & Sturm

[57] ABSTRACT

A hopper apparatus of a type intended for dispensing granular or powdery materials into a conveying system. A container associated with the hopper apparatus has a pair of tapering walls with a discharge opening therebetween. A conveyor loading chamber below the discharge opening and adjacent one of the container walls is in communication with a conveying system. A screen is pivotally mounted to and extends along one of the tapering walls. The screen also overlies the conveyor loading chamber to prevent foreign matter from entering the conveyor. A projection connected to the screen lies slightly in the path of movement of the conveyor to thereby vibrate the screen. A plate mechanism disposed between the discharge opening and the conveyor loading chamber is spaced sufficiently from the wall and screen to allow the powdery or granular matter to pss by, but close enough to the wall such that it will trap larger foreign objects and hold such foreign objects out of the main flow path.

15 Claims, 6 Drawing Figures

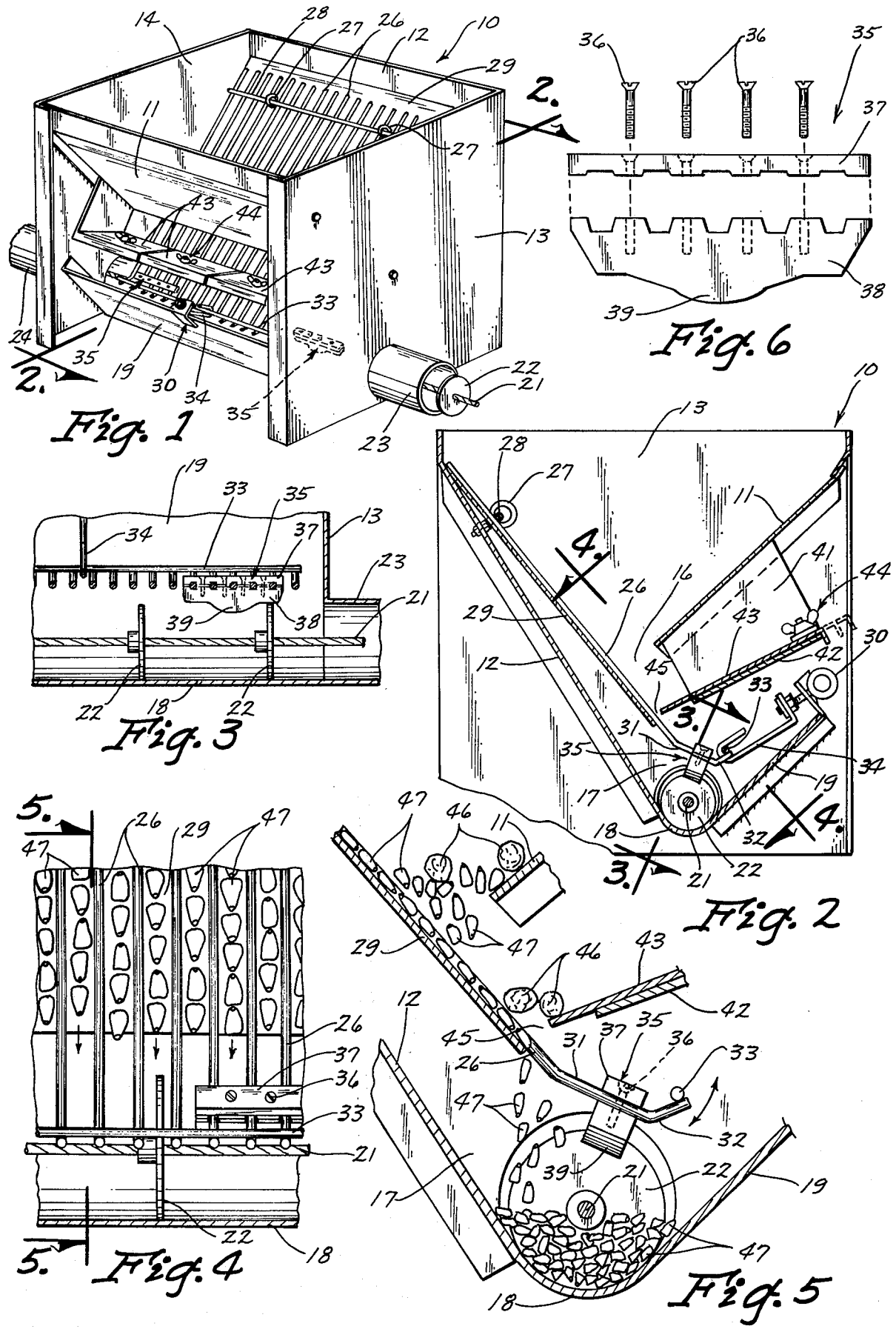

HOPPER SCREENING APPARATUS

BACKGROUND OF THE INVENTION

The present invention relates generally to hoppers for handling granular or powdery materials and more particularly to a hopper designed to introduce granular or powdery materials into a conveyor system and to simultaneously control the flow and filter out foreign objects and hold them out of the main path of flow.

In any conveying system there is an initial step of introducing the material to be conveyed into the system. It is important to most conveying systems that the flow of material be controlled, since too little flow will not deliver the required amount of the delivery points and excessive flow will sometimes clog up the conveyor itself and sometimes cause considerable damage or associated problems. This has been found to be true especially in cable conveying systems of a type having a cable with enlarged inserts thereon which structure is designed to pull powdery or granular materials through a tube or similar structure.

Particularly when powdery or granular products, such as poultry or livestock feeds containing grains such as corn, is the control of flow a problem. This is true primarily because such materials have a tendency to stick together when the flow stops so that it can be difficult to get the material to begin to flow again when desired. Agitators have been designed to compensate for this problem, but some such agitators merely tend to pack the material more tightly when the flow is stopped and agitation continues.

It is also important to keep contaminants and foreign objects out of materials, for purity, and to prevent damage to the conveyor itself. It is well known to use screening devices of various types, but such screens must be cleaned often or the flow therethrough will stop or become too slow. There is therefore a need for screening devices which will not become clogged and stop the flow therethrough.

SUMMARY OF THE INVENTION

The present invention relates to a hopper apparatus for introducing granular or powdery materials into a conveyor. A container having a discharge opening therein also has one sidewall which extends beyond and below the container and discharge opening to a conveyor loading chamber. A screen is disposed along the wall, through the discharge opening and over the conveyor loading chamber to thereby screen foreign objects out of the material to be conveyed. The screen is vibrated by having a projection in contact with the moving conveyor to thereby achieve the desired flow into the conveyor. A plate mechanism disposed between the discharge opening and the aperture traps foreign objects and holds them out of the main flow path of the material.

An object of the present invention is to provide a controlled flow of material into a conveying means.

Another object of the present invention is to prevent powdery or granular material from packing so tightly that it will not flow adequately.

A further object of the present invention is to provide apparatus for screening foreign objects from material to be conveyed.

Still another object of the present invention is to provide a device for holding foreign objects which have been filtered out of the material being handled out of the main flow path.

A still further object is to provide a device which will handle larger grains through a smaller screen than would usually be necessary.

Other objects advantages and novel features of the present invention will be apparent from following description of a preferred embodiment of the invention.

BRIEF DESCRIPTION OF THE DRAWINGS

FIG. 1 shows a perspective view of a preferred embodiment of the present invention;

FIG. 2 is a cross-sectional view taken along line 2—2 of FIG. 1;

FIG. 3 is a partial cross-sectional view of the present invention taken along line 3—3 of FIG. 2;

FIG. 4 is a partial cross-sectional view taken along line 4—4 of FIG. 2;

FIG. 5 is an enlarged partial cross-sectional view taken along line 5—5 of FIG. 4; and FIG. 6 is an enlarged exploded view showing a projection used for vibrating an agitating screen.

DESCRIPTION OF THE PREFERRED EMBODIMENT

Referring now to the drawings wherein like reference numerals designate identical or corresponding parts throughout the several views, FIG. 1 illustrates a hopper 10 constructed in accordance with the present invention. A sloping front wall 11 and a sloping back wall 12 are connected at the ends thereof to a pair of sidewalls 13 and 14. A discharge opening 16 is formed generally between the sloping walls 11 and 12. The back sloping wall 12 leads to a conveyor loading chamber 17 which has a bottom wall 18 and an upwardly sloping wall 19 substantially defining the chamber 17.

A cable 21 having a plurality of circular plastic discs 22 attached rigidly thereto is disposed in the conveyor loading chamber 17 and forms the moving part of what is commonly referred to as a cable conveying system. A pair of tubular extensions 23 and 24 extend outwardly from the sidewalls 13 and 14 respectively. These extension members 23 and 24 connect to a tubular conveying network which forms a complete circuit along the cable 21 being disposed inside thereof.

A screen 26 is pivotally attached to the back wall 12 of the hopper 10 by a pair of eye bolts 27. These eye bolts 27 are substantially larger than the connecting rod 28 which is rigidly attached to each of the rods forming the screen 26. The fact that the eye bolt 27 is substantially larger than the rod 28 allows the screen 26 to float somewhat and this aids in the vibration of the screen 26 as will be discussed below. A sheet metal member 29 is secured to the screen 26, for example by welding. It is to be understood, however, that the sheet of material 29 does not have to be rigidly secured to the screen 26 to be operative.

The bottom portion of the screen 26 has a first straight portion 31 thereon and a second straight portion 32 thereon. The effect of this bend is that the section 32 is bent generally away from the conveyor loading chamber 17 so as to substantially prevent granular or powdery materials from going into the conveyor loading chamber 17 without passing through the screen 26. A rod 33 is secured to the end 32 of the screen 26 such as by welding. This rod 33 in turn has a screen hook 34 attached thereto. This screen hook 34 is threadedly connected to a depth control device 30. It is to be understood that when the depth control device 30 is rotated in one direction that the lower end 32 of the screen 26 will be pulled upwardly, and when the depth control device 30 is rotated in an opposite direction that the lower section 32 of the screen 26 will be accordingly moved downwardly.

A projection structure 35 is shown clearly in FIG. 6, and this projection structure 35 is connected to the screen 26 along the first portion 31 of the rods of screen 26. This projection structure 35 is preferably made of a plastic material such as nylon, similar to the plastic material of which the inserts or discs 22 are constructed. A plurality of screw-like devices 36 are used to clamp the two sections 37 and 38 of the projection structure 35 together. Preferably two of the projection structures 35 are placed on the screen 26, each being located one rod away from the sides of the screen 26. Accordingly, when the cable 21 is moving laterally through the conveyor loading chamber 17, the lower portion 39 of the projection structure 35 will come in contact with the moving discs 22. As each disc 22 hits each projection structure 35, the screen 26 will be vibrated accordingly, as will be clearly understood from viewing the drawings in FIGS. 2, 3 and 5. The main function of the depth control device 36 as discussed above is to set the amount that the projection member 35 contacts the discs 22 and in such way this provides a control for setting the amount of intensity of the desired vibration of the screen 26.

A pair of brackets 41 are attached to each end of the sloping wall 11 and these brackets 41 are connected at the ends thereof by a crossing sheet metal piece 42. Three plates 43 are adjustably attached to the crossing piece 42 by the wing nut and bolt structure 44. A slot (not shown) in either the plate 43 or in the crossing piece 42 allows for the plate 43 to be adjustable with respect to the crossing piece 42 and with respect to the screen 26 as is clearly shown in solid and dashed lines in FIG. 2. These three plates 43 may be aligned with respect to each other or they may be at differing positions to allow more flow past one plate than past another. The purpose of these plates 43 are twofold. The first function of the plates 43 is to adjust the amount of flow between the plate 43 and the screen 26 at the opening 45. It will be clearly understood that if the opening 45 is made larger that the flow therethrough will be increased and, conversely, if the opening 45 is made to be smaller, the flow will accordingly decrease.

The other function of the plates 43 are to form a trap mechanism for trapping large foreign particles 46 (FIG. 5) to prevent them from eventually passing into the conveyor loading chamber 17. Accordingly, it can be seen in FIG. 5 that the plates 43 substantially trap the foreign particles 46 and hold them out of the main flow path of the grain, shown as corn 47 in the drawings of FIGS. 4 and 5.

Accordingly, it can be seen that the disclosed structure does indeed accomplish the objects mentioned above. Obviously, many modifications and variations of the present invention are possible in light of the above teachings. It is therefore to be understood that, within the scope of the appended claims, the invention may be practiced otherwise than as specifically described.

We claim:
1. A hopper comprising:
 a housing;
 a container connected to said housing having sidewalls and a discharge opening at the bottom thereof, one of said sidewalls being at an angle between horizontal and vertical, said one wall extending on both sides of said opening;
 screening means attached to said container and being positioned substantially along said one wall, said screening means extending on both sides of said opening;
 means forming a conveyor loading chamber below said discharge opening, said chamber being in communication with a conveying means, said screening means extending over said chamber; and
 means for vibrating said screening means.

2. A hopper as defined in claim 1 wherein said screening means is pivotally attached at the rear thereof to said one wall.

3. A hopper as defined in claim 1 wherein said screening means is pivotally attached near the top thereof to said one wall.

4. A hopper as defined in claim 3 wherein said screening means comprises a plurality of rods having the bottom ends thereof turned in a direction away from said chamber.

5. A hopper as defined in claim 4 wherein said one wall forms a part of said chamber, a bottom chamber wall being connected to said one wall and a wall extends upwardly from the other side of said bottom chamber wall.

6. A hopper as defined in claim 5 wherein said upwardly extending wall is disposed at an angle between vertical and horizontal.

7. A hopper as defined in claim 1 wherein said conveying means comprises a flexible cable having a plurality of inserts thereon and said vibrating means comprises a projection attached to said screening means, said projection being positioned within the path of travel of said inserts.

8. A hopper as defined in claim 7 wherein the front of the screen is supported by a screen hook connected thereto and to said housing.

9. A hopper as defined in claim 8 wherein means connected to the screen hook for adjusting the vertical position of said screen and thereby of said projection for controlling the amount of contact that the projection makes when the inserts.

10. A hopper as defined in claim 1 having means connected to said housing for trapping foreign objects and holding such objects out of the main flow path of the material passing through the hopper.

11. A hopper as defined in claim 10 wherein said trap means comprises a plate disposed between said opening and said chamber, one end of said plate being adjacent said screening means.

12. A hopper as defined in claim 11 wherein said plate is disposed at an angle between vertical and horizontal.

13. A hopper as defined in claim 12 wherein means are connected to said housing for adjusting the position of said plate with respect to said screen.

14. A hopper as defined in claim 13 wherein said trap means comprises a plurality of plates.

15. A hopper as defined in claim 11 wherein said screening means comprises a plurality of aligned rods connected together near the ends thereof and a sheet of material is attached to the underside of said rods from a point near the top of the rods to a point adjacent said one end of the plate.

* * * * *